UNITED STATES PATENT OFFICE.

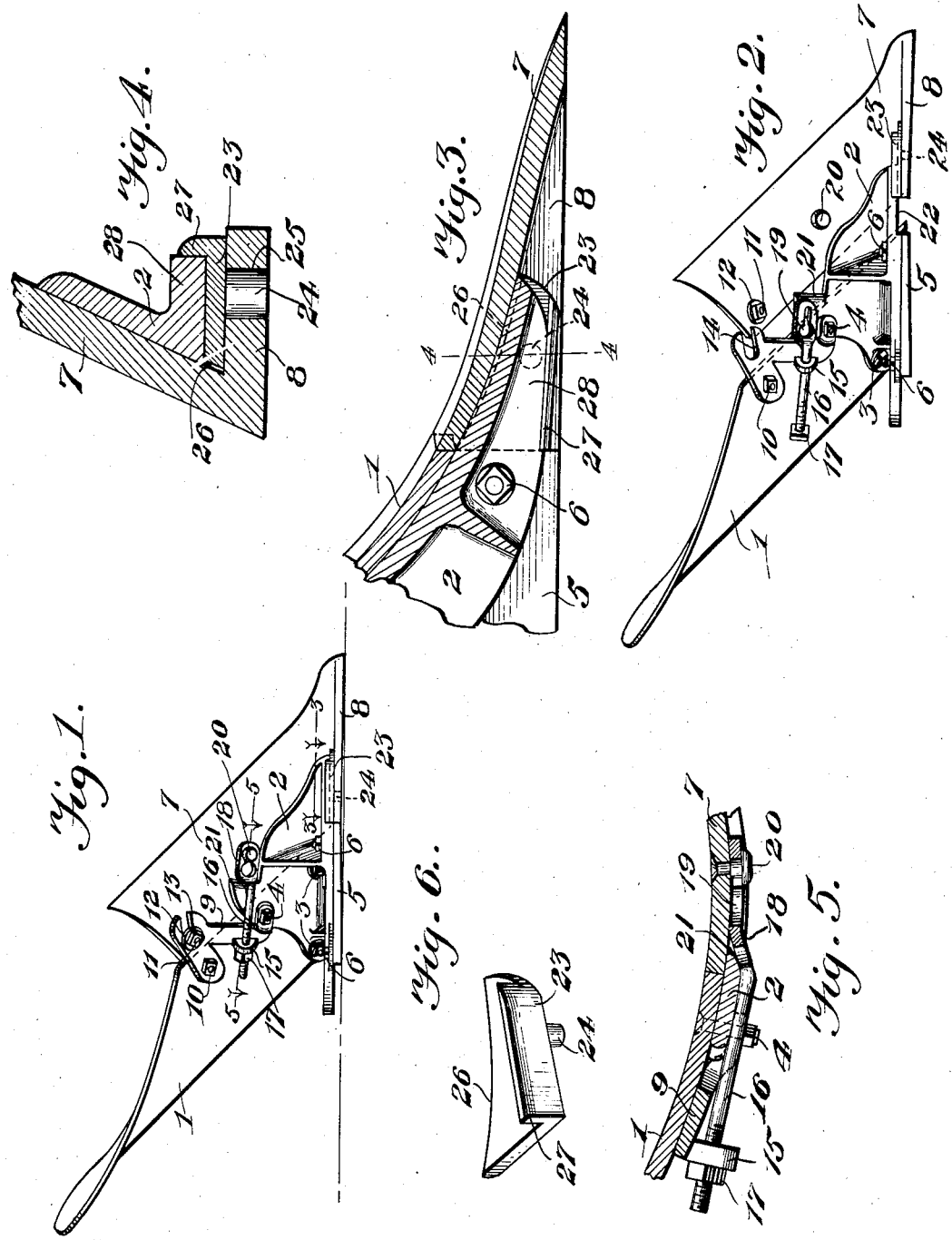

JOHN F. SHEAHAN, OF CANTON, ILLINOIS, ASSIGNOR TO PARLIN & ORENDORFF COMPANY, OF CANTON, ILLINOIS, A CORPORATION OF ILLINOIS.

PLOW.

1,120,856.  Specification of Letters Patent.  Patented Dec. 15, 1914.

Application filed June 4, 1914. Serial No. 842,856.

*To all whom it may concern:*

Be it known that I, JOHN F. SHEAHAN, a citizen of the United States, residing at Canton, in the county of Fulton and State of Illinois, have invented new and useful Improvements in Plows, of which the following is a specification.

The invention relates to plows and more particularly to means for securing the share of the plow body in position whereby the same may be removed for repairs, sharpening and the like.

An object of the invention is to provide simple and effective means for rigidly and securely holding the share in position, but which can be easily and readily disengaged.

With the above and other objects in view the invention consists in certain novel features of construction, formation, and combination of parts as hereinafter set forth and pointed out in the appended claims.

In the accompanying drawings; Figure 1 is an inverted plan view of the plow body. Fig. 2 is a similar view showing the share disconnected. Fig. 3 is a detail section on the line 3—3 of Fig. 1 taken in the direction of the arrows as shown. Fig. 4 is a detail section taken on the line 4—4 of Fig. 3. Fig. 5 is a section on the line 5—5 of Fig. 1 taken in the direction of the arrows as shown, and Fig. 6 is a detail perspective view.

The invention will be best understood from a consideration of the following detailed description, taken in connection with the accompanying drawings forming a part of this specification, with the further understanding that while the drawings show a partial form of the invention, the latter is not confined to any strict conformity with the showing of the drawings, but may be changed and modified so long as such changes and modifications mark no material departure from the salient features of the invention.

Like and corresponding parts are indicated by similar reference characters throughout the several views.

The mold-board indicated by the numeral 1 is connected to the frog 2 by means of bolts 3 and 4 respectively in the usual manner. The landside bar 5 is also rigidly connected to the frog 2 by means of bolts 6. The share 7 is provided with a landside flange 8 and is adapted to be connected to the mold-board and frog.

The foregoing parts and connections as named are within the art and further detail description is thought unnecessary.

As stated in the beginning of the specification, the invention seeks to provide a quick detachable connection between the share and the remaining parts of the plow body. This connection comprises a brace 9 having its lower arm rigidly connected to the frog by means of the bolt 4, and its upper arm rigidly connected to the mold board by means of the bolt 10.

A bolt 11 is carried by the heel portion of the share and is provided with a washer 12 and nut 13. This bolt is arranged to engage a notch 14, formed in one end of the upper arm of the brace. When the share is in position its heel will be securely held in place by tightening the nut 13.

The brace 9 is provided with an apertured lug 15 through which extends a bolt 16 having one end threaded upon which is a nut 17, and the opposite end of the bolt is flattened and offset as at 18. The flattened end 18 of the bolt is slotted, having an enlarged portion 19 being slightly larger than the head of a bolt 20 secured to the share whereby the end 18 of the bolt may be easily placed over the head of the bolt 20 and the reduced portion of the slot receive the shank portion of the bolt 20.

The offset portion of the bolt 16 rides upon the beveled edge 21 of the upper portion of the frog when tightening the nut 17, which will pull the heel of the share against the edge of the mold board and the upper face of the frog thereby forming a tight and smooth connection.

The rear end of flange 8 abuts against the forward end of the landside bar 5 and the toe end of the frog projects over the rear end of the flange. The landside face of the toe end of the frog is cut away as at 22, and interposed between the toe end of the frog and shaft flange is a locking plate 23. This locking plate is provided with a projecting stud 24 which is adapted to rest within an opening 25 formed within the shaft flange 8 whereby a pivoted connection between the locking plate and flange is provided. The upper edge 26 of the locking plate has substantially the same configuration as the inner face of the shaft, but is spaced therefrom as better shown in Figs. 3 and 4, and the outer edge of the plate is provided with a flange 27.

The landside flange 28 of the toe end of the frog is tapered and by forcing this tapered end of the frog upon the locking plate between the flange 27 and the share 7 a wedging action takes place, thereby rigidly locking the toe end of the share to the frog. By having the locking plate pivotally mounted upon the share flange 8 it will permit the frog to be readily placed into position and will take up any irregularities in the toe end of the frog due to imperfections in the manufacture of same.

The share may be readily removed by loosening the nuts 13 and 17 and moving the bolt 16 forward so that the portion 19 of the slot is in alinement with the head of the bolt 20, whereby the bolt 16 can be disconnected from the share by pulling out upon the forward end of the bolt. Then by moving the share longitudinally it will be separated from the other parts of the plow body, as indicated in Fig. 2.

The improved construction serves to rigidly hold the share in position while permitting a quick detachable connection.

I claim as my invention:—

1. The combination with a plow, a removable share having a landside flange, of a removable locking plate carried by said flange and the frog of the plow adapted to be engaged by said plate for locking the share to the frog.

2. The combination with a plow having a moldboard and a removable share, of a detachable plate pivotally mounted upon the share for locking the same to the moldboard substantially as described.

3. In a plow body, a frog having a tapered toe, a share having a landside flange, means detachably mounted upon the landside flange for locking said tapered toe between the share and the landside flange.

4. The combination with a plow having a moldboard, a frog and a removable share having a landside flange, of a plate resting upon one face of the landside flange, and the frog being adapted to be engaged by said plate for locking the share thereto.

5. The combination of a plow, a share having a landside flange, of a plate mounted upon said flange, a frog provided with a toe portion adapted to rest upon said plate, means for locking the share to the plow body whereby said toe portion will be wedged between the plate and share for the purpose specified.

6. In a plow body, a frog having longitudinally extending shoulders on its landside and main portion at its forward end, a share having a landside flange, a pivotally mounted plate carried by the landside flange, said shoulders being adapted to rest between the share and said plate for the purpose specified.

7. In a plow body, a frog having longitudinally extending and tapered shoulders, a share having a landside flange, a pivotally mounted plate carried by the landside flange, said plate having a socket adapted to receive said tapered shoulders for locking the toe end of the share to the moldboard of the plow body for the purpose specified.

8. In a plow body, a frog having longitudinally extending shoulders on its landside and main portion at its forward end, a share having a landside flange, a plate pivotally mounted upon said landside flange, a flange formed upon one edge of said plate and the said shoulders adapted to be retained between the flange on the said plate and the share for locking the share to the remaining parts of the plow body for the purpose specified.

9. In a plow body, a frog having longitudinally extending shoulders, a share having a landside flange, a plate adapted to rest upon the landside flange, a stud extending from said plate and adapted to rest within an opening formed within said landside flange, said plate being adapted to retain the shoulders of the frog between the landside flange and share for locking the toe end of the share to the frog substantially as described.

10. In a plow comprising a frog having a moldboard and landside bar permanently connected thereto, a share having a landside flange, a detachable connection between the share and the remaining parts of the plow, a beveled projection carried by the moldboard, and a longitudinally extending bolt adapted to ride upon said beveled projection for forcing the share in position upon the plow.

11. In a plow body comprising a frog having a moldboard and landside bar permanently connected together, a share having a landside flange, of a detachable connection between the share and the remaining parts of the plow body, said connection comprising a bracket carried by a moldboard, means for locking the heel portion of the share to the said bracket, a longitudinally extending bolt adjustably mounted upon said bracket, a detachable connection between the bolt and the share, a plate pivotally mounted upon the landside flange, a tapered toe portion formed integrally with the frog and adapted to rest within said plate for locking the toe portion of the share to the frog for the purpose specified.

12. In a plow body comprising a frog having a moldboard, a landside bar permanently connected thereto, a share having a landside flange, of a detachable connection between the share and the remaining parts of the plow body, said connection comprising a bracket carried by the moldboard and frog for locking the heel portion of the share to the moldboard, an apertured lug carried by the bracket, a bolt slidably and adjustably mounted within the apertured lug, said bolt having a flattened end provided with a slot, a bolt projecting from said share and adapted to be received by the slot formed within the first mentioned bolt, means for adjusting the first mentioned bolt whereby the share will be held in place upon the plow body; a plate pivotally mounted upon the landside flange of the share, a tapered toe portion carried by the frog and adapted to rest upon said plate whereby the toe portion of the share will be held in locking engagement with the frog for the purpose specified.

13. The combination with a plow body, a removable share having a landside flange, of a swinging plate mounted upon said flange, a frog provided with a toe portion, and means for forcing the toe end of the frog between the swinging plate and share for locking the same together.

14. The combination with a plow body, having a moldboard and a detachable share, of means for locking the share to the moldboard, a bolt included in said locking means having an offset portion, a beveled projection carried by the moldboard and the offset portion of the bolt being adapted to ride upon the beveled projection whereby the share will be drawn in place upon the moldboard for the purpose specified.

15. In a plow, a frog having longitudinally extending shoulders, on its landside and main portion at its forward end, a share having a landside flange, a plate pivotally mounted upon said landside flange, a connection between the heel end of the share and frog whereby the shoulders of the frog may be forced between the plate and share for locking the toe end of the share to the frog substantially as described.

In witness whereof, I hereunto subscribe my name to this specification in the presence of two witnesses.

JOHN F. SHEAHAN.

Witnesses:
HARRY P. HAMMOND,
W. M. CAVE.